United States Patent
Muthukrishnan et al.

(10) Patent No.: US 12,499,027 B2
(45) Date of Patent: Dec. 16, 2025

(54) MODELS FOR DETECTING AND MANAGING EXCESSIVE LOG PATTERNS

(71) Applicant: Oracle International Corporation, Redwood Shores, CA (US)

(72) Inventors: Nagarajan Muthukrishnan, Foster City, CA (US); Ravi Shankar Thammaiah, Redwood City, CA (US); Sumanta Kumar Chatterjee, Menlo Park, CA (US); Binoy Sukumaran, Foster City, CA (US); Abhishek Chitre, Karnataka (IN); Mohit Singal, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 17/715,443

(22) Filed: Apr. 7, 2022

(65) Prior Publication Data
US 2023/0325294 A1    Oct. 12, 2023

(51) Int. Cl.
*G06F 11/30* (2006.01)
*G06F 11/34* (2006.01)
*G06F 16/17* (2019.01)
*G06F 16/174* (2019.01)

(52) U.S. Cl.
CPC ...... *G06F 11/3072* (2013.01); *G06F 11/3006* (2013.01); *G06F 11/3476* (2013.01); *G06F 16/1734* (2019.01); *G06F 16/174* (2019.01)

(58) Field of Classification Search
CPC ............. G06F 11/3072; G06F 16/1734; G06F 16/174; G06F 11/3006; G06F 11/3476
USPC ......................................................... 707/822
See application file for complete search history.

(56) References Cited

U.S. PATENT DOCUMENTS

| | | | |
|---|---|---|---|
| 10,817,604 B1* | 10/2020 | Kimball | G06F 21/563 |
| 10,885,167 B1 | 1/2021 | Lador et al. | |
| 11,113,144 B1* | 9/2021 | Gadepalli | G06N 3/08 |
| 2009/0187560 A1* | 7/2009 | Arning | G06F 16/90344 707/999.005 |
| 2013/0332601 A1* | 12/2013 | Nakil | H04L 45/16 709/224 |
| 2014/0157407 A1* | 6/2014 | Krishnan | G06F 21/53 726/22 |
| 2015/0101044 A1 | 4/2015 | Martin et al. | |
| 2017/0031741 A1 | 2/2017 | Seigel | |
| 2017/0180187 A1 | 6/2017 | Whitner et al. | |

(Continued)

*Primary Examiner* — Cam Linh T Nguyen
(74) *Attorney, Agent, or Firm* — Invoke

(57) ABSTRACT

Embodiments described herein include a log management system that detects and addresses excessive log patterns at runtime. In some embodiments, the log management system tracks cumulative attributes associated with patterns that repeat within a set monitoring files, such as a set of log or trace records. The cumulative attributes that are monitored may include the cumulative storage size and/or cumulative count of patterns detected in the monitoring files. The log management system may determine whether a triggering condition is satisfied for initiating a responsive action to reduce the amount of log data that is transmitted and/or stored. If the triggering condition is satisfied, then the log management system may remove one or more instances of the pattern from the monitoring files and/or perform other actions to reduce the overhead of logging operations.

18 Claims, 7 Drawing Sheets

(56) References Cited

U.S. PATENT DOCUMENTS

| | | | |
|---|---|---|---|
| 2018/0059965 A1* | 3/2018 | Goodman | G06F 3/0619 |
| 2018/0060191 A1* | 3/2018 | Goodman | G06F 3/0619 |
| 2018/0107411 A1* | 4/2018 | Goodman | G06F 11/1471 |
| 2019/0079818 A1 | 3/2019 | Handa et al. | |
| 2019/0182101 A1* | 6/2019 | Kulshreshtha | H04L 41/0631 |
| 2019/0332508 A1* | 10/2019 | Goyal | G06F 11/3414 |
| 2019/0340057 A1 | 11/2019 | Brown et al. | |
| 2020/0125725 A1 | 4/2020 | Petersen et al. | |
| 2021/0406106 A1* | 12/2021 | Moss | G06F 11/0706 |
| 2021/0406112 A1* | 12/2021 | Moss | G06F 11/0751 |
| 2022/0012633 A1* | 1/2022 | Molahalli | H04L 41/50 |
| 2022/0197717 A1* | 6/2022 | Pandey | G06F 9/5088 |
| 2023/0229540 A1* | 7/2023 | King | G06F 11/3006 714/57 |
| 2023/0325294 A1* | 10/2023 | Muthukrishnan | G06F 16/1734 709/224 |

\* cited by examiner

FIG. 6

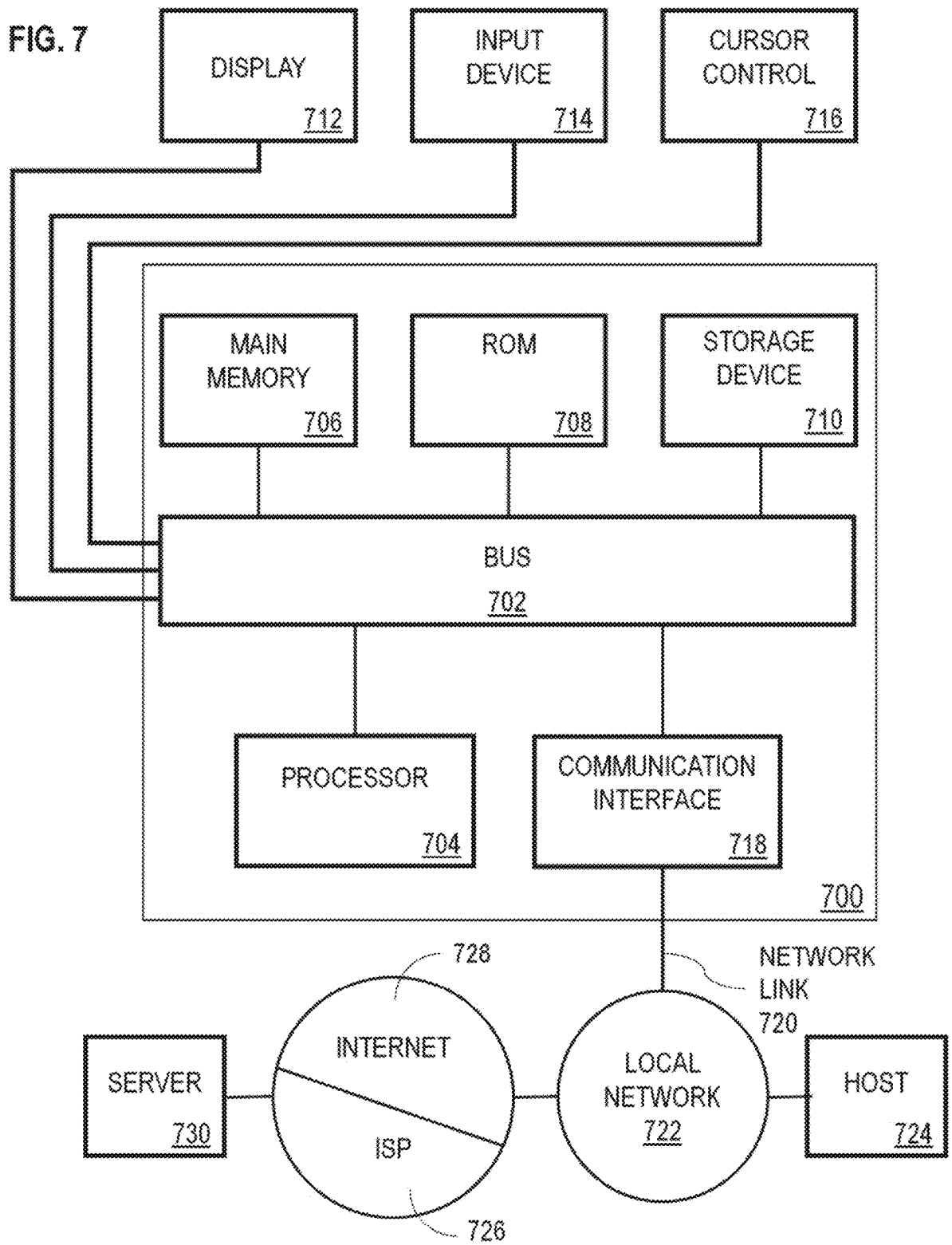

MODELS FOR DETECTING AND MANAGING EXCESSIVE LOG PATTERNS

TECHNICAL FIELD

The present disclosure relates to managing the generation of log and trace data by computing resources. In particular, the present disclosure relates to techniques for reducing the amount of log and trace data stored within files.

BACKGROUND

Many types of computing systems and applications record operational information, warnings, and error conditions in log files, which may be subsequently reviewed to analyze system or application behavior. A log file may document events that provide insight into various problems, threats, systemic issues, and performance issues associated with operation of a system or application, and various patterns related thereto. An event record stored in a log file may include diagnostic information related to an event, including a time of occurrence of the event, a description of the event, and a user of an application program associated with the event.

The rate at which log data is generated may vary significantly during system or application runtime. A spike in the log rate may be caused by an increase in user activity or may be the result of problematic system or application behavior. If left unchecked, sudden spikes in log data may give rise to a condition referred to as log flooding, which may saturate network bandwidth with transmission of log data, overload computing storage resources, and degrade system performance. In severe cases, log flooding may cause a system-wide crash, disrupting the experience of connected users and potentially resulting in data loss.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example report identifying detected log patterns and aggregated information in accordance with some embodiments; and FIG. 7 shows a block diagram that illustrates a computer system in accordance with some embodiments.

DETAILED DESCRIPTION

Figure 1:
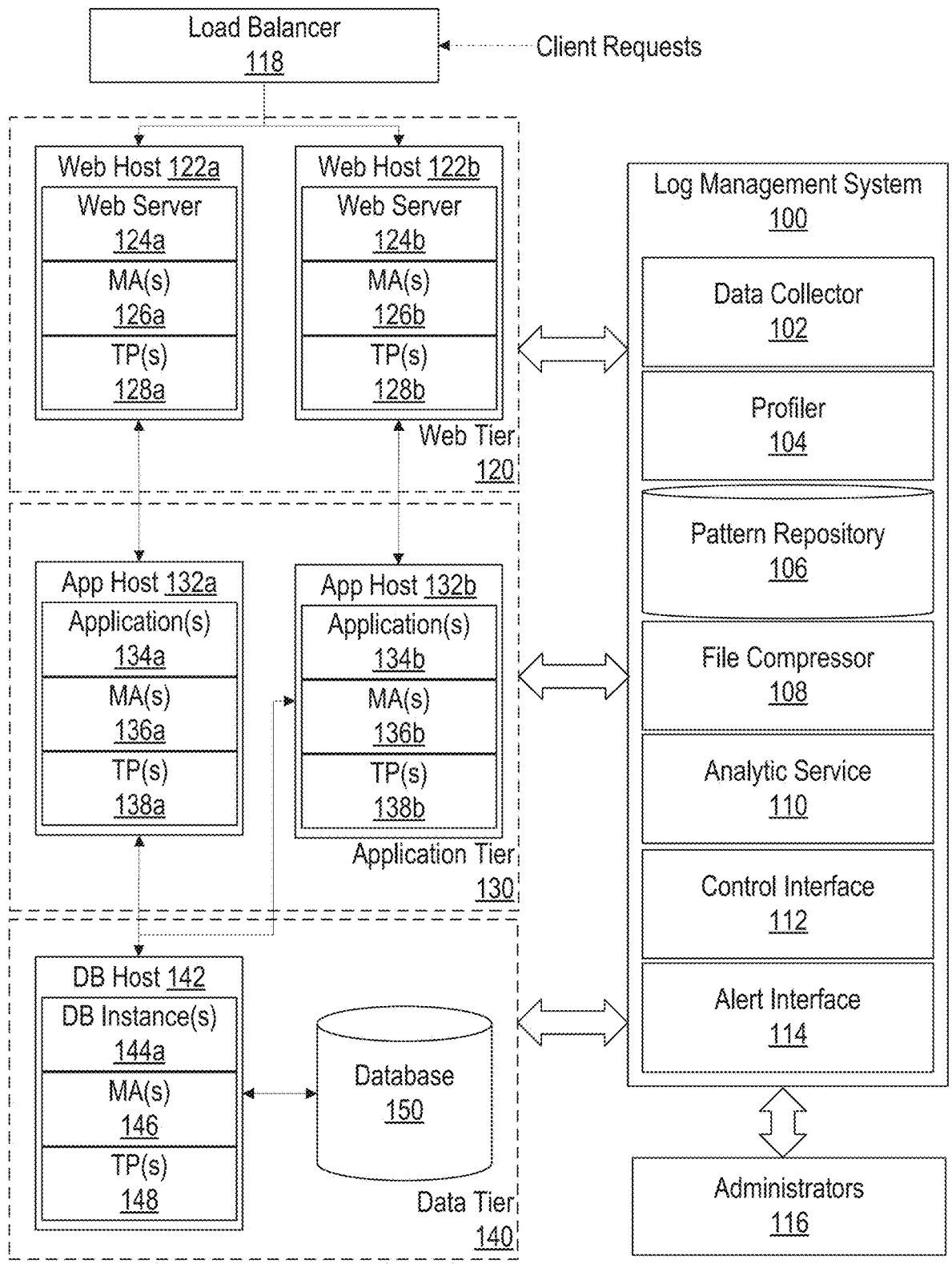
FIG. 1 illustrates an example log management system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

In complex computing systems and applications, several components may generate trace messages and other log data. For example, varying components may independently track the operation of hardware, operating systems, application instances, web servers, databases, network connections, user sessions, and/or other computing resources. The components may monitor activity and operations across several different tiers or layers of heterogenous applications. In distributed environments, such as cloud computing environments, the components may further monitor activity and operations for computing resources that are geographically dispersed and connected by a network. Given the vast number of resources that may generate log data for large-scale, heterogenous applications in cloud environments, the amount of log data to analyze may be overwhelming. The vast number of resources and amount of log data may also increase the risk of flooding, where logging activity consumes excessive amounts of system resources. Problematic behavior with one system component may cascade to other interconnected components, significantly spiking the log rate and degrading system performance.

A log management system may expose a configurable trace or log level to control the log rate and mitigate the risk of log flooding. When a log level is defined, messages that do not satisfy a severity threshold, determined based on the defined log level, may be filtered. For example, the following types of log messages may have increasing levels of severity: debugging messages, informational messages, warning messages, error messages, and fatal error messages. A log level may be set to filter messages that are less severe than warning messages or some other level of severity to reduce the amount of log data that is stored. If the level is set to warning messages, then informational messages and debugging messages may be filtered out such that the messages are not stored or otherwise retained during logging operations. Thus, the system may reduce the amount of log data that is stored at runtime. However, this approach may not prevent flooding conditions in certain scenarios, especially where problematic behavior results in an increased rate of severe messages across several different components. An excessive amount of trace and other log data may reduce storage and input/output (I/O) capacity, induce failures at the application-layer, and bring down nodes in a distributed compute environment.

Embodiments described herein include a log management system that detects and addresses excessive log patterns at runtime to mitigate or prevent log flooding. In some embodiments, the log management system tracks cumulative attributes associated with patterns that repeat within a set monitoring files, such as a set of log or trace records. The cumulative attributes that are monitored may include the cumulative storage size and/or cumulative count of patterns detected in the monitoring files. The log management system may determine whether a triggering condition for initiating a responsive action to address flooding is satisfied based on the cumulative attributes associated with patterns in the monitoring files. For example, a pattern that repeats at a high rate of frequency may be indicative of a current or imminent flooding threat.

To detect and address the potential threat, the log management system may determine the triggering condition is satisfied if the cumulative memory size and/or count of a log pattern across one or more monitoring files exceeds a threshold value. In response, the log management system may modify one or more monitoring files to remove one or more instances of the pattern, thereby shrinking the size of the modified file(s). Removal of several instances of a pattern and/or instances of several different patterns may significantly reduce the log data that is transmitted and stored within a system, preventing oversaturation of network, I/O, and storage resources from excessive logging activity.

In some embodiments, the log management system differentiates between different patterns when monitoring for excessive trace and log records. Some log and trace patterns may be frequent during normal operation of a system. The log management system may detect such patterns and refrain from applying the same triggering conditions as for anomalous patterns. The log management system may use machine learning and/or substitution methodologies to classify patterns and build a pattern repository that distinguishes between known normal patterns, known problematic patterns, and unknown patterns. The log management system may use the identified patterns maintained through the pattern repository to scan log records for problematic patterns, filtering log data when a triggering condition is satisfied.

When removing instances of a log pattern, the log management system may maintain one or more messages that conform to the pattern to facilitate diagnostics. Additionally or alternatively, the log management system may maintain metrics and other information about the log pattern including the number of times the pattern has repeated, the amount of memory space consumed by the pattern, and the source of the pattern. The information may be consumed by diagnostic processes and/or presented to administrators and developers to aid detection of the root cause of the problematic behavior causing the excessive generation of the log pattern.

One or more embodiments described in this Specification and/or recited in the claims may not be included in this General Overview section.

2. Architectural Overview

Execution of a complex application typically involves the coordination and use for many different hardware and software resources. For instance, hardware resources, such as processing cores, memory, network ports, database storage space, etc., are often allocated during application runtime. Various software resources may also be allocated such as operating system (OS) resources, virtual machine instances, database instances, and/or other software services. A hardware and/or software resource that is involved in execution of a software application or cloud service is hereby referred to as a "target resource".

Monitoring services may be deployed alongside target resources to provide runtime information about the application. A monitoring service may comprise an application, application module, operating system component, service processor, hardware module, or other computer-implemented logic that generates trace or other types of log data for one or more target resources. Monitoring services that generate trace or log data may be referred to as a trace or log provider. Example trace and log providers may include, diagnostic loggers that generate trace messages and log execution information, metric tracking services that track and collect metric values measuring resource usage, and event loggers that track and record specific events, or some combination thereof. Data that is generated by a trace or log provider is herein referred to as log data, which may include trace messages, log messages, metric values, event logs, or any other data that measures or otherwise indicates a state of a target resource.

In some embodiments, a monitoring service may manage a plurality of other monitoring services or nodes. For instance, a log provider may manage a plurality of individual trace providers. As another example, a metric trace provider may manage a plurality of metric sensors that each collect different metric values. In yet another example, an event logger trace provider may manage a plurality of individual event loggers that track different events. The log management system described further herein may control both individual sources of log data and parent providers that aggregate log data from multiple sources.

In some embodiments, the log management system accounts for the topology of an application when analyzing log patterns. A topology in this context refers to the overall architecture, arrangements, types of resources, dependencies and/or usage of resources during runtime. The log management system may adapt the pattern monitoring techniques described further herein with changes in the topology. For example, the log management system may detect when additional resources are added and, in response, adjust runtime monitoring to analyze patterns from the additional sources of log data.

Complex software applications may include a plurality of tiers or layers. Each tier or layer of a multi-tier application represents a distinct logical and/or physical element that is responsible for a different set of functions. The number and configuration of tiers within a multi-tier architecture may vary, depending on the particular implementation. For instance, a three-tier system may include a presentation tier comprising logic for displaying and/or receiving information, an application tier comprising logic for implementing application-specific functions, and a data tier comprising logic for storing and retrieving data. In other examples, the multi-tier architecture may include, in addition or alternatively to the tiers previously listed, a web tier comprising logic for processing web requests, a middleware tier comprising logic to connect other tiers within the architecture, and/or other tiers comprising one or more software and/or one or more hardware components. In some cases, trace data for one or more tiers may be of more interest to a user than trace data from other tiers. For instance, a database administrator may be more interested in generating trace data for the data tier than from other tiers in the system. On other hand, an application administrator may be interested in both the application tier and the database tier since the application tier may have more dependencies on the database tier than vice versa. Administrators may provide information to the log management system about which tiers and/or other resources are of interest. Log management system may tailor alerts and/or other actions based on the input.

In a clustered environment, software components may be deployed across a plurality of physical and/or virtual hosts, which may be distributed across multiple datacenters and geographic locations. For example, a first instance of an application may execute on a first host machine and a second instance of the application may execute on a second host machine. If one of the nodes in a cluster becomes non-operational, it may result in increased traffic on another node as requests may be redirected to the node that is operational. Therefore, trace data across different nodes may be of interest to capture a complete picture of performance degradation in some instances. A failure at one node may further cause an increase in trace data generated by components on another node, even when the nodes may be remotely located.

FIG. 1 illustrates an example log management system in accordance with some embodiments. As illustrated in FIG. 1, log management system 100 includes data collector 102, profiler 104, pattern repository 106, file compressor 108, analytic service 110, control interface 112, and alert interface 114. In other embodiments, log management system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, log management system 100 controls the log data that is generated within a multi-tier application including the components deployed in web tier 120, application tier 130, and data tier 140. With reference to the multi-tier application, client requests are received at load balancer 110. In response, load balancer 110 routes the request to one of web host 122a or web host 122b, which include web server 124a and web server 124b, respectively. Application (App) hosts 132a and 132b execute application(s) 134a and application(s) 134(b), which provide application-specific functions for processing the requests. Database (DB) host 142 executes DB instance(s) 144 to manage storage and retrieval of information from database 150 in response to the client requests and/or requests received from applications deployed in application tier 130. Although a particular topology of the multi-tier application is depicted, the actual topology of the application monitored by log management system 100 may vary from implementation to implementation. The application may include additional or fewer tiers and target resources. Further, the topology of the multi-tier application may change over time with the addition, removal, and/or update of target resources.

In some embodiments, a set of monitoring agents are deployed on each host to monitor the topology of the multi-tier application. The monitoring agents (MAs) include, MA(s) 126a, 126b, 136a, 136b, and 146. A monitoring agent may be a background process, such as a daemon, that executes on the corresponding host machine and generates information about the targets that are installed on the machine. For instance, the monitoring agents may generate information that identifies what type of resource has been detected, connections between the target resource and other system resources, and/or other relationships associated with a target component. Data collector 102 may collect the topology metadata and analyze the metadata to monitor for changes in components and resource dependencies in the multi-tier application.

A set of one or more trace providers (TPs) are also deployed on each host, including TP(s) 128a, 128b, 138a, 138b, and 148. Each trace provider may be selectively enabled or disabled by control interface 112. If enabled, the respective trace provider generates trace and/or other log data which is collected by data collector 102. The trace providers may also be configured to generate trace and log messages in accordance with a set of options defined in a tracing profile. For example, the tracing profile may specify a log level as previously described. Log messages that do not satisfy the log level may be filtered such that the messages are not transmitted and stored in a log file. Additionally or alternatively, the trace providers may filter log messages to reduce transmission and storage of excess log patterns as described further herein.

Data collector 102 aggregates log data generated by various components in the multi-tier application, such as TPs 128a, 128b, 138a, 138b, and 148. Data collector 102 may gather the log data in real-time as the log data is generated, periodically in batches, or on demand. Data collector 102 may record the log data, which may include operational information, warnings, and error conditions, in one or more monitoring files. For example, a monitoring file may include log and trace messages generated by a hardware processor, a database server, a network adapter, and/or other computing resources.

Profiler 104 analyzes the collected log data to detect and classify log patterns. A pattern may correspond to an abstracted or normalized representation of a set of one or more log messages. For example, profiler 104 may generate a pattern representation using one or more regular expressions (regexes) and/or other classifiers. Example patterns are discussed further below. Profiler 104 may further analyze log patterns to determine whether the behavior is abnormal or otherwise problematic. Profiler 104 may register detected patterns and associated classifications with pattern repository 106. Profiler 104 may raise a flag if excessive or otherwise problematic behavior is detected in log patterns.

Pattern repository 106 stores detected patterns and associated registration data, which may indicate whether the pattern represents problematic or normal behavior. Pattern repository 106 may be any type of storage unit and/or device (e.g., a file system, database, collection of tables, or any other storage mechanism) for storing the pattern registration data. Further, pattern repository 106 may include multiple different storage units and/or devices. The multiple different storage units and/or devices may or may not be of the same type or located at the same physical site. Further, pattern repository 106 may be implemented or executed on the same computing system as one or more other components of log management system 100. Alternatively or additionally, pattern repository 106 may be implemented or executed on a computing system separate from one or more other components of log management system 106. When remotely implemented, pattern repository 106 may be communicatively coupled to via a direct connection or via a network.

File compressor 108 reduces the size of monitoring files by removing instances of a recurrent log pattern. File compressor 108 may find instances of a log pattern by matching messages to regexes and/or other pattern representations. Once detected, file compressor 108 may remove the log data conforming to the pattern to shrink the file. In some embodiments, file compressor 108 may refrain from removing a minimum threshold number of instances of the pattern in a monitoring file. The remaining instances may serve as example messages for the compressed pattern, which may be helpful for diagnostics. In other embodiments, file compressor 108 may remove all instances of the pattern from the file.

Analytic service 110 provides automated analysis of log patterns. In some embodiments, analytic service 110 computes statistics, such as frequency and count values, of instances of one or more log patterns. Additionally or alternatively, analytic service 110 may compute other metrics such as the current memory size and/or file size consumed by instances of one or more log patterns.

Control interface 112 includes hardware and/or software through which log management system 100 interacts with log generating sources, such as TPs 128a, 128b, 138a, 138b, and 148. For example, control interface 112 may comprise an application programing interface (API) and/or a messaging interface through which commands are directed to configure and control the trace providers. Control interface 112 may selectively enable and disable trace providers and/or reduce and increase trace logging levels. Additionally or alternatively, control interface 112 may publish pattern updates to the trace providers and/or other system components to allow for distributed monitoring and mitigation of problematic logging behavior.

Alert interface 114 includes hardware and/or software for triggering alerts when problematic logging activity is detected. In some embodiments, administrators 116 register via alert interface 114 to receive alert notifications. Administrators 116 may input contact information such as an email address, short message service (SMS) number, and/or social media handle. Alert interface 114 may allow different administrators to register for different types of alerts. For instance, database administrators may register to receive alerts stemming from database resources, network administrators may register for alerts stemming from network resources, and application administrators may register for alerts stemming from application resources. When abnormal pattern behavior is detected, alert interface 114 may determine which administrators to notify and the communication channel to use (e.g., email, SMS message, social media post) based on the registration data.

In some embodiments, the multi-tier application, log management system 100, and/or subcomponents thereof may be implemented as a cloud service. For instance, the system may be implemented in a platform-as-a-service (PaaS) that allows multiple subscribers of the cloud service to share resources for building and hosting web-based applications. As another example, the system may be implemented in a software-as-a-service (SaaS) to analyze logging activity within a subscriber's environment. Additional embodiments and/or examples relating to computer networks are described below in Section 7, titled Computer Networks and Cloud Networks.

3. Building a Pattern Repository

When log management system 100 is deployed within an environment, such as a test or production environment, for the first time, profiler 104 may monitor log data for problematic and nonproblematic behavior. Profiler 104 may then populate pattern repository 106 with the detected patterns to build a data store of known good patterns and known problematic problems. Profiler 104 may further populate pattern repository 106 with additional information about the problematic patterns including interim remedies to address the problematic behavior and registered contact information of administrators to contact about the pattern. Once built, pattern repository 106 may serve to identify, group, and segregate trace record and/or other log data patterns.

Figure 2:
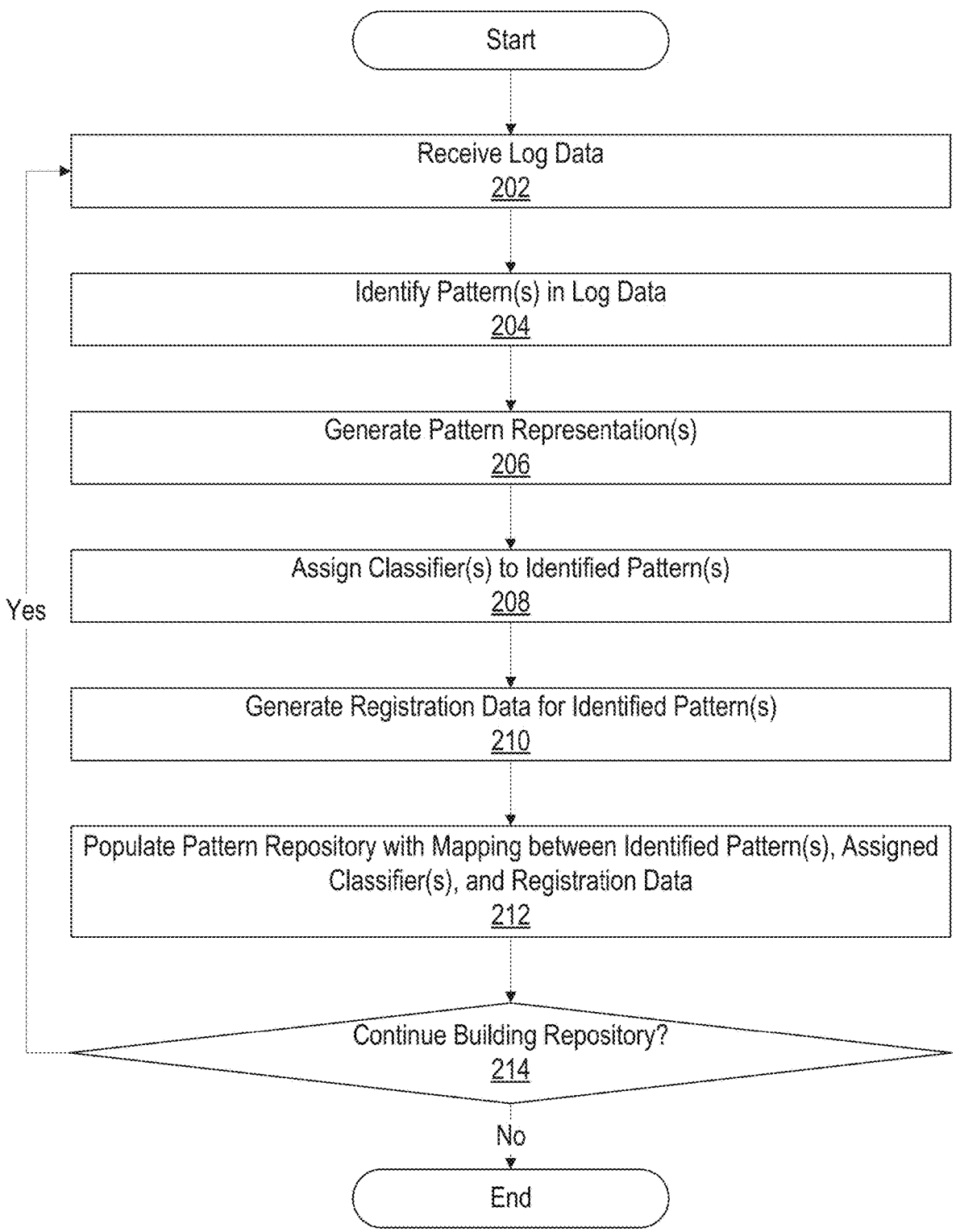
FIG. 2 illustrates an example set of operations for building a pattern repository in accordance with some embodiments.

FIG. 2 illustrates an example set of operations for building a pattern repository in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

In operation 202, profiler 104 receives a set of log data. As previously described, log data may be collected from multiple components, which may span multiple layers in a multi-tier application. In other embodiments, profiler 104 may independently analyze log data originating from a single component or multiple components in the same tier.

In operation 204, profiler 104 identifies one or more patterns in the received log data. As described further below, log messages may include overlapping parts and variable parts. Profiler 104 may scan the log data for recurrence of overlapping and/or variable parts of the log messages to group and classify messages. Additionally or alternatively, profiler 104 may apply semantic models to the log data to detect patterns in the semantic meaning of the log messages. The log data may be grouped based on commonalities in the detected semantic meaning. A semantic model may use natural language processing and/or machine learning to estimate the meaning of a message.

In operation 206, profiler 104 generates a pattern representation for each of the one or more identified patterns. In some embodiments, profiler 104 may generate a regular expression, also referred to as a regex, to represent a pattern in the log data. A regular expression defines a pattern using a sequence of metacharacters and/or literals. A metacharacter is an operator that specifies a search process or algorithm for matching data. For example, the metacharacter "." matches any character, the metacharacter "*" matches zero or more occurrences of a preceding subexpression, which may be a literal or another metacharacter, [ . . . ] matches any character in a list, {m, n} matches at least m, but not more than n occurrences of a preceding subexpression, and (?i) matches literal subexpressions in a case-insensitive manner. A literal is the actual character and/or sequence of characters to match. For example, "systemSubComponents" may be used as a literal subexpression to represent occurrences of this term in log data.

Regexes may comprise a combination of metacharacters and literals to represent a pattern for multiple log records with messages that overlap but are different in content. For example, the regex "(?i}system*.component" defines a case-insensitive pattern where zero or more characters occur between the literal subexpression "system" and "component". Thus, the example regex matches, among other possible combination, the following: "SYSTEMCOMPONENT", "System_Component", "System SubComponent", etc.

In some embodiments, profiler 104 generates a pattern representation by analyzing the messages for a constant or overlapping part and a variable part. Profiler 104 may then generate a set of regexes and/or other group classifiers to represent the detected log patterns. As an example, profiler 104 may detect the following messages within a set of input log data:

[M01] Created 1 resources for pool sysman-opss-ds, out of which 1 is available and 0 are unavailable.

[M02] Created 1 resources for pool emgc-sysman-pool, out of which 1 is available and 0 are unavailable.

[M03] Connection for pool emgc-sysman-pool has been closed.
[M04] 33% of the total memory in the server is free
[M05] Connection for pool mds-owsm has been closed.
[M06] deleting log file: diagnostic-144.log, size: 10467701 bytes
[M07] Connection for pool mds-sysman mds has been closed.
[M08] deleting log file: diagnostic-201.log, size: 2154623 bytes
[M09] Created 1 resources for pool mds-owsm, out of which 1 is available and 0 are unavailable.
[M10] 45% of the total memory in the server is free Profiler 104 may group the messages based on the overlapping and variable parts of the messages as follows:

[P1] Create 1 resources for pool . . . out of which 1 is available and 0 are unavailable.
[P2] Connection for pool . . . has been closed.
[P3] . . . of the total memory in the server is free
[P4] deleting log file: . . . size: . . . bytes In the illustrated example, profiler 104 generates four pattern representations based on ten log messages. However, the number patterns and the pattern representations that are generated may vary depending on the log data that is profiled.

In some embodiments, profiler 104 may use a substitution model to generate and update pattern representations. With substitution, profiler 104 may perform a syntactic transformation of raw log data into a normalized pattern. For instance, profiler 104 may replace or "substitute" the variable portions of a set of log messages with one or more of the aforementioned metacharacters and/or one or more placeholder values. The remaining parts of the log messages may be converted to the literals in a regex that also includes the substituted metacharacters and/or placeholder values.

In operation 208, profiler 104 assigns one or more classifiers to each of the one or more identified patterns. In some embodiments, the classifiers indicate whether the detected pattern is problematic or not. For example, profiler may assign the labels known problematic, known good, and/or unknown to patterns based on whether the observed behavior associated with the pattern was problematic or not. Additionally or alternatively, other labels may be assigned to further classify the pattern behavior.

In a supervised approach, an administrator or other user may assign labels during the building phase to inject domain knowledge on what system logging behavior is normal and what system logging behavior is problematic. In an unsupervised approach, profiler 104 may automatically assign labels based on one or more system metrics that are linked or otherwise associated with the pattern. For instance, profiler 104 may detect whether logging activity associated with the pattern consumes more than a threshold amount of system resources or degrades system performance more than a threshold. Profiler 104 may compare system metrics to one or more thresholds to make the determination. Example metrics may include the amount of network bandwidth, number of I/O operations, and memory size consumed by logging activity associated with the pattern. If the one or more thresholds are satisfied (e.g., performance degrades more than a threshold or resource consumption for the pattern is greater than one or more metric thresholds), then profiler 104 may classify the pattern as problematic.

In operation 210, profiler 104 generates registration data for the identified patterns. In some embodiments, the registration data includes source identifiers that indicate the origin of one or more log messages conforming to the pattern. For example, a source identifier may indicate whether a log message in the pattern originates from a database server, hardware processor, operating system and/or other system component. As another example, a source identifier may include a link to the source code that generated a log record conforming to the pattern. Additionally or alternatively, the registration data may include other metadata that describes or otherwise contextualizes the pattern to facilitate diagnostics when problematic logging behavior is detected.

In some embodiments, the registration data includes contact information for an administrator to alert if the pattern is detected. Certain log patterns may have a higher priority for one administrator than another administrator. For instance, a database administrator may be more likely to quickly diagnose problems originating from a database server than a network administrator or application administrator. Profiler 104 may automatically map patterns to registered administrators based on properties of the pattern including the source of the logging activity conforming to the pattern.

In operation 212, profiler 104 populates pattern repository 106 with mappings between each identified pattern and the one or more assigned classifiers and registration data associated with the pattern. The mappings may be stored in a table, linked list, or similar data structures that allows computing processes to quickly scan and fetch the pattern data.

In operation 214, profiler 104 determines whether to continue building the repository. As previously noted, profiler 104 may receive log data in streams, batches or on demand. Profiler 104 may continue to analyze, detect, and add new patterns to pattern repository 106 with new log patterns as new data is received.

Once built, pattern repository 106 may be accessed by monitoring processes to detect and mitigate log flooding. Pattern repository 106 may be deployed in the same environment in which it was built and/or a different environment with similar logging subsystems. For example, pattern repository 106 may initially be built in a test environment for developing and updating a multi-tier application, where access is restricted to the application developers and administrators. Pattern repository 106 may then be copied or otherwise deployed in a production environment where the end users interact directly with the muti-tier application.

Additionally or alternatively, the techniques for building pattern repository 106 may be applied during development, testing, and/or across different production environments. Log patterns that are present in one environment may not be present in another environment. Further, patches, changes in the topology, and/or other system modifications may change standard logging behavior. Profiler 104 may detect and adapt to the changes, learning new patterns and updating pattern classifications based on the supervised and unsupervised techniques previously described. Thus, pattern repository 106 may represent a repository of patterns learned in different environments and through various means.

4. Learning New Patterns

In some embodiments, profiler 104 may train and apply one or more machine learning models to detect and classify log patterns. Machine learning (ML) include systems and processes that implement self-learning algorithms for extrapolating outcomes and recommendations. With machine learning, profiler 104 may make inferences and adjustments during application runtime rather than relying on static instruction sets to detect and classify log patterns.

Thus, profiler 104 may adapt in real-time to varying and evolving behavior without requiring additional hard-coding to account for new patterns.

In some embodiments, profiler 104 implements a machine learning algorithm that iterates over a set of training data to learn a target model f for mapping a set of input variables to an output variable. The training data may include log pattern examples and associated labels that indicate whether the pattern is problematic or normal. The input variables for the target model f may be extrapolated or otherwise extracted from the example log patterns in the training dataset. The output variable of the target model f may be extrapolated or otherwise extracted based on the labels in the training dataset.

A machine learning algorithm may include supervised components and/or unsupervised components. With supervised learning, administrators or other users may assign training examples a label or correct labels that were previously assigned. Based on the supervised input, profiler 104 may generate or update the machine learning model. With unsupervised learning, profiler 104 may train the data without labels, and the model may estimate output variables based on automatically detected metrics, such as the cumulative resource metrics associated with the log patterns. Various types of algorithms may be used to train a machine learning model. Examples include linear regression, logistic regression, linear discriminant analysis, classification and regression trees, naïve Bayes, k-nearest neighbors, learning vector quantization, support vector machines, artificial neural networks, bagging and random forest, boosting, backpropagation, and/or clustering.

Figure 3:
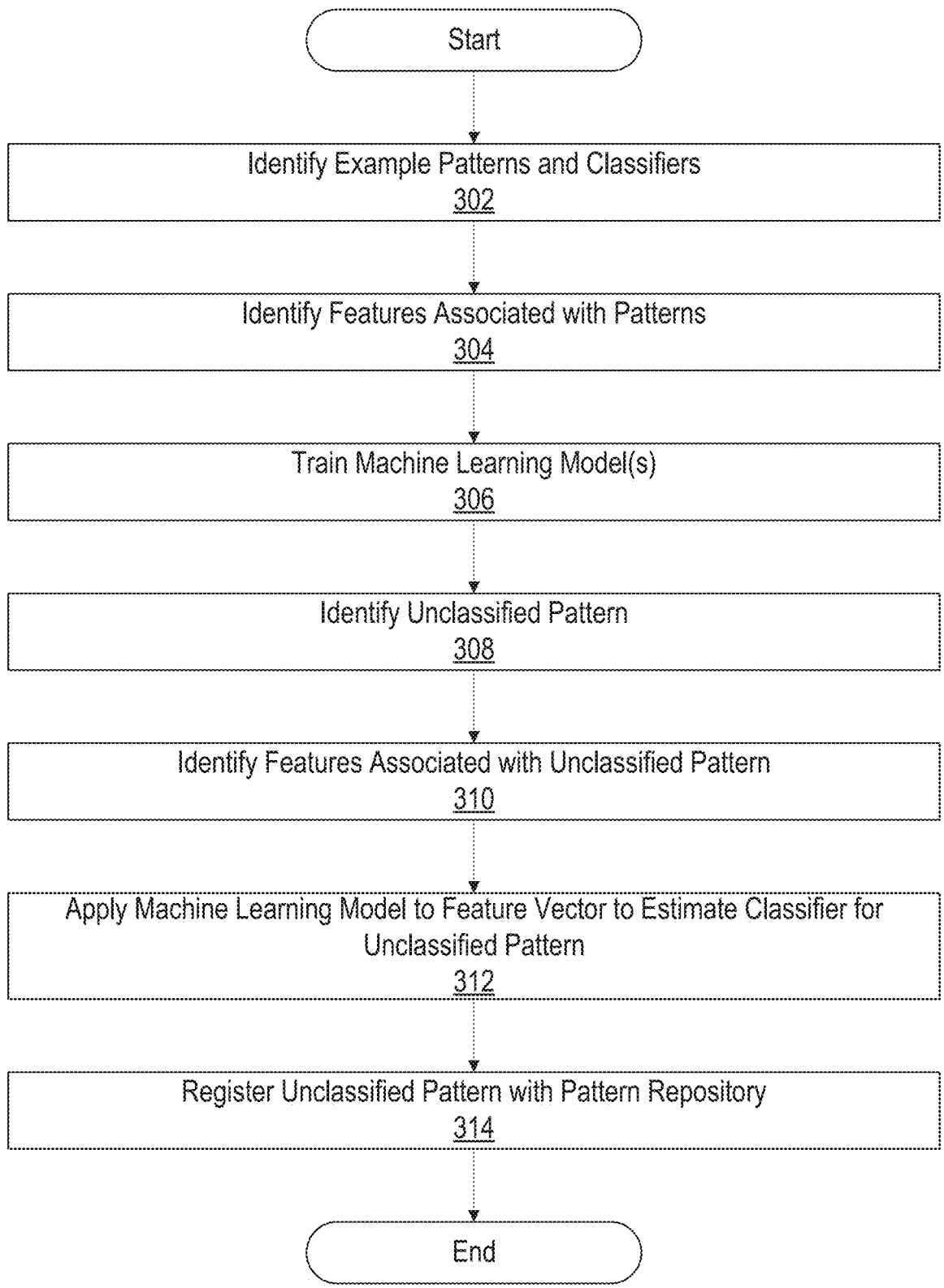
FIG. 3 illustrates an example set of operations for learning new patterns from log data in accordance with some embodiments.

FIG. 3 illustrates an example set of operations for learning new patterns from log data in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

In operation 302, profiler 104 identifies as set of example patterns and classifiers in a training dataset. For example, the training dataset may comprise a set of regexes and labels that indicate whether the example regex represents a known good pattern or a known problematic pattern. As previously noted, with supervised or semi-supervised learning, the labels may be assigned by an administrator. With unsupervised learning, profiler 104 may automatically assign a label or classifier based on metrics associated with the patterns. For instance, profiler 104 may determine based on cumulative resource consumption detected for the pattern and/or system performance degradation metrics whether the pattern represents normal or problematic behavior. Profiler 104 may then assign a corresponding classifier to the example.

In operation 304, profiler 104 identifies set of features associated with the pattern. In some embodiments, the features are extracted based on the regex representing the pattern. For example, a feature may correspond to the presence or absence of a literal or sequence of literals and/or metacharacters in the regex, where a 1 may be assigned to indicate that the regex includes the feature (the literals and/or other keywords are included) and a 0 indicates the absence of the feature (the literals and/or other keywords are not included). Additionally or alternatively, a feature may be based on observed metrics associated with a pattern, such as the average or cumulative observed storage costs associated with the regex or the network bandwidth consumed by the logging pattern. Other features associated with the log patterns may also be used to train the model and may vary from implementation to implementation. In some embodiments, profiler 104 may select a subset of available features based on which features minimize an error function and/or are predictive for estimating a label.

In operation 306, profiler 104 trains a machine learning model to estimate labels for patterns. For example, profiler 104 may train a neural network using backpropagation, decision tree using a random forest walkthrough, or support vector machine using a kernel function. Additionally or alternatively, profiler 104 may train other machine learning models and/or implement other machine learning algorithms to minimize the estimation error of the machine learning model. During training, candidate machine learning models may be applied to a test dataset to determine whether the estimated label matches an observed label. An indication of whether the estimated label and observed label match may returned as feedback to tune the model parameters and improve model accuracy.

In operation 308, profiler 104 identifies an unclassified log pattern. For example, while monitoring log data, profiler 104 may generate a regex that was not included in the training dataset and does not match any patterns within pattern repository 106.

In operation 310, profiler 104 identifies features associated with the unclassified pattern. In some embodiments, profiler 104 extracts the same features used to train the machine learning model. For example, profiler 104 may determine whether a new regex includes certain sequences of literals and/or metacharacters and/or extract resource consumption metrics associated with executing the log pattern. Even though the feature values may overlap with examples in the training dataset, the combination of feature values for the unclassified pattern may be unique and not previously encountered by log management system 100.

In operation 312, profiler 104 applies the trained machine learning model to the feature vector to estimate a classifier and/or another label for the unclassified pattern. In some embodiments, profiler 104 estimates whether the unclassified pattern represents problematic or normal logging activity. Additionally or alternatively, profiler 104 may predict whether the log pattern is relevant or not to various administrators. Profiler 104 may assign one or more corresponding labels based on the prediction(s).

In operation 314, profiler 104 registers the newly classified pattern with pattern repository 106. The registered pattern may indicate whether the log management system 100 estimates the activity is problematic or normal. Additionally or alternatively, the registered pattern may identify administrators that log management system 100 predicts to be interested in the activity.

Profiler 104 may use the trained machine learning model to monitor log data in real-time. New log patterns that are predicted to be problematic may be flagged. Early detection of these patterns allows log management system 100 to prevent or mitigate flooding from significantly impacting system performance. Preventative measures to reduce the impact of log operations may be performed. Example actions to reduce the log data that are stored is described further below. Log management system 100 may further provide early notice to administrators 116 with targeted alerts sent to the administrator most likely to resolve the underlying root cause of the anomalous logging behavior.

5. Runtime Monitoring and Modification of Log Data

In some embodiments, log management system 100 monitors detected pattern activity to determine whether the pattern behavior satisfy conditions for triggering actions to reduce the performance impact of logging operations. Log management system 100 may analyze cumulative attributes of the patterns within a moving window of time to determine in real-time, the impact of the pattern on system performance. Additionally or alternatively, management system 100 may further apply machine learning models, as previously described, to predict the impact of pattern activity. If the triggering conditions are satisfied, then log management system 100 may execute one or more operations to reduce the impact of the problematic behavior on system performance. Example operations include reducing a logging level, compressing log data stored in log files, filtering log data transmitted over a network, disabling one or more trace providers, halting logging operations on one or more compute nodes, and/or sending an alert to one or more administrators.

Figure 4:
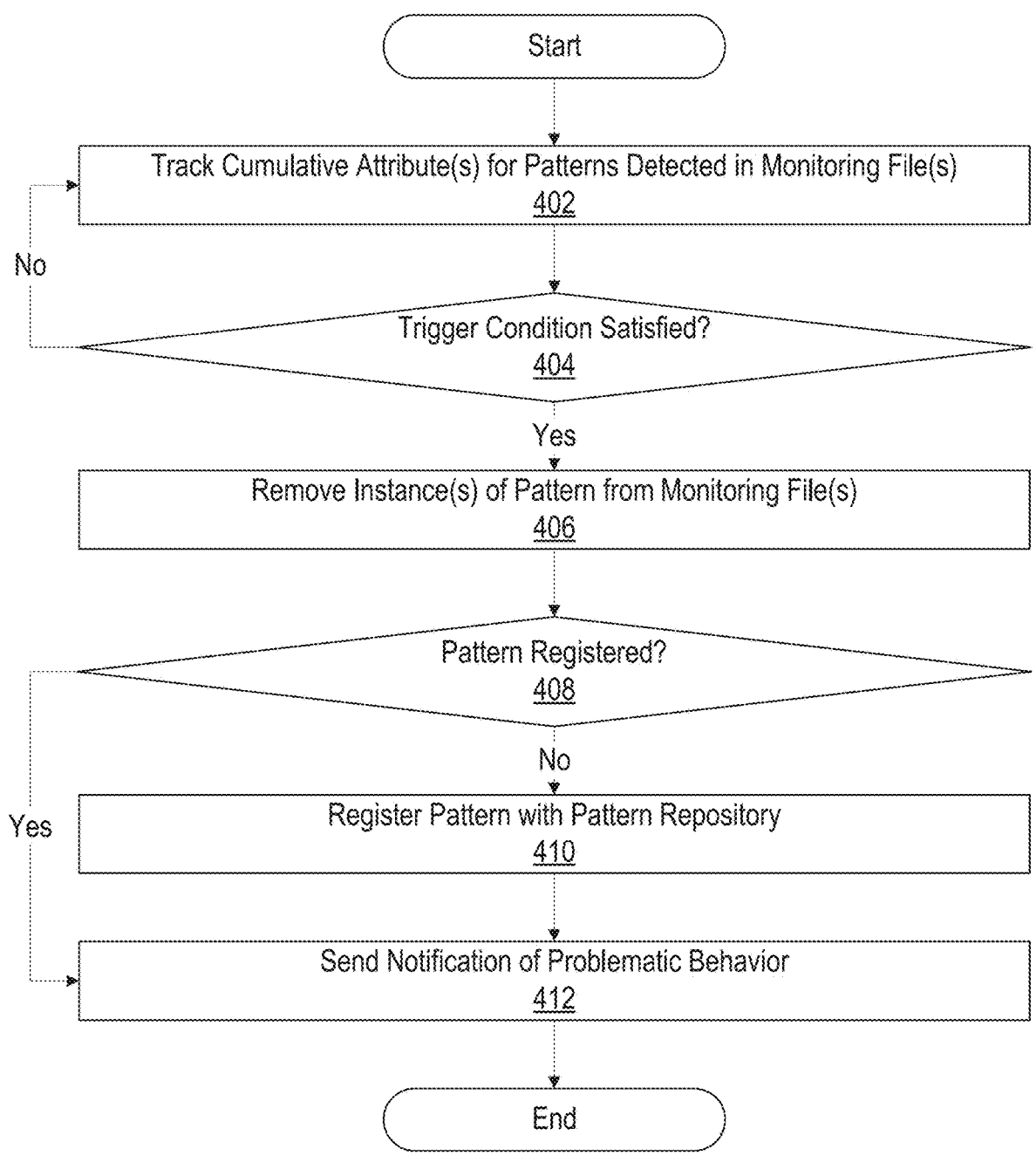
FIG. 4 illustrates an example set of operations for monitoring for excessive log data in accordance with some embodiments.

FIG. 4 illustrates an example set of operations for monitoring for excessive log data in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

In operation 402, profiler 104 tracks one or more cumulative attributes for patterns that have been detected. In some embodiments, profiler 104 scans log data for patterns that match a regex or other pattern representation. As noted previously, multiple log messages may be mapped to the same pattern even though variable parts of the messages may differ. If profiler 104 detects a match, then profiler 104 may update a cumulative attribute associated with the pattern, such as by incrementing a count value mapped to the detected pattern or adding the memory size of the detected log message conforming to the pattern to a cumulative storage size.

In operation 404, profiler 104 determines whether a triggering condition is satisfied. Profiler 104 may check the triggering condition each time a cumulative attribute for a pattern is updated, periodically, on demand, or responsive to another event. Checking the triggering condition may include comparing a cumulative attribute to a threshold value. For example, profiler 104 may compare a cumulative memory size for a pattern to a storage threshold. As previously noted, the cumulative memory size may be computed by summing the size of multiple log message conforming to the pattern even if the log messages are not identical. Profiler 104 may determine that the triggering condition is satisfied if the cumulative memory size exceeds a storage threshold within a threshold timeframe, such as within a particular window of time. Additionally or alternatively, profiler 104 may compare a cumulative count value to a count threshold. Multiple log messages that conform to the pattern may cause the count value to increment even if the log messages are not identical. Profiler 104 may determine that the triggering condition is satisfied if the cumulative count value exceeds the threshold within a threshold timeframe.

In the examples above, profiler 104 analyzes triggering conditions on a per pattern basis. Additionally or alternatively, profiler 104 may determine cumulative attributes across multiple patterns. For example, profiler 104 may determine the cumulative storage overhead and/or count for multiple problematic problems. Profiler 104 may determine that the triggering threshold is satisfied if the aggregate count and/or storage exceeds a threshold. As another example, profiler 104 may analyze the size of one or more log or other monitoring files. If the overall size of the one or more files exceeds a threshold, regardless of the patterns stored therein, profiler 104 may determine that the triggering condition is satisfied.

In some embodiments, different thresholds may be defined for different patterns and/or groups of patterns. For example, a lower storage and/or count threshold may be defined for patterns classified as problematic than for patterns classified as normal. Thus, if the machine learning model classifies a pattern as problematic, then profiler 104 may more proactively trigger a responsive action to reduce the overhead of logging activity, with a lesser size or count satisfying the threshold compared to patterns classified as normal.

In operation 406, file compressor 108 removes one or more instances of a log pattern from one or more monitoring files if the triggering conditions are satisfied. In some embodiments, file compressor 108 scans one or more monitoring files for log messages conforming to the pattern that satisfied the triggering condition. For example, file compressor 108 may scan a log file for messages matching the search pattern defined by a regex. File compressor 108 may flag each match for removal.

In some embodiments, file compressor 108 may remove instances of more than one pattern when a triggering condition is satisfied. For example, file compressor 108 may scan for instances of all patterns that have been classified as problematic or all patterns that have a cumulative count value and/or size more than a threshold, which may be different than the triggering condition. For each pattern that satisfies the removal threshold, file compressor 108 may scan the one or more monitoring files using the pattern regex or other representation for matches. Matches may then be flagged for removal.

In some embodiments, file compressor 108 tracks statistics and/or other metrics associated with patterns flagged for removal. For example, file compressor 108 may count the number of instances, total size, and file location of instances of a pattern flagged for removal. During the removal operation file compressor 108 may physically delete the flagged messages from storage or the space may be reclaimed for other uses. When reclaimed, the deleted messages may remain until a subsequent process overwrites the data. File compressor 108 may further logically and/or physically rearrange the file blocks such that the remaining messages in the monitoring files (the messages that were not deleted) are contiguously stored.

In some embodiments, file compressor 108 leaves a minimum threshold number of instances of a log pattern as a reference. For example, file compressor 108 may leave at least one instance of a log message conforming to a pattern in one of the monitoring files from which the pattern was removed. However, the threshold may vary depending on the particular implementation and, in some cases, all instances of a pattern may be deleted.

Figure 5:
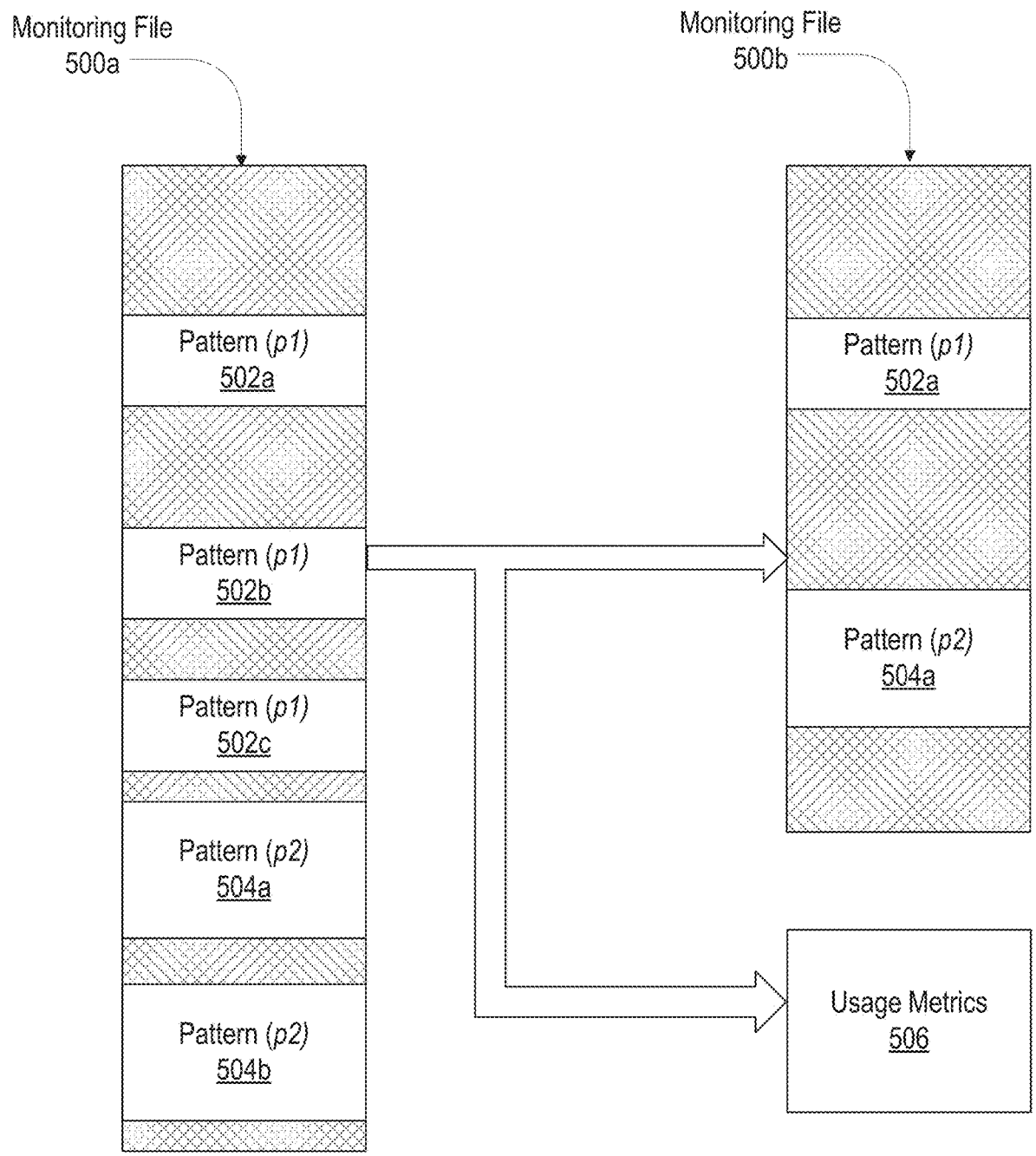
FIG. 5 illustrates an example modification to a monitoring file in accordance with some embodiments.

FIG. 5 illustrates an example modification to a monitoring file in accordance with some embodiments. Monitoring file 500a includes three instances of pattern p1 (instances 502a, 502b, and 502c) and two instances of pattern p2 (instances 504a and 504b). Updated monitoring file 500b shows the file after two instance of pattern p1 (instances 502b and 502c) and one instance of pattern p2 (instance 504b) have been deleted. One instance of each pattern (instances 502a and 504a) remain undeleted within updated monitoring file 500b. The size of monitoring file 500a is reduced by the aggregate size of the deleted instances.

Usage metrics 506 tracks the aggregate count and size for patterns p1 and p2. Usage metrics 506 may include aggregates values for the deleted instances excluding the undeleted instances and/or aggregate values for all of the instances including the undeleted instances. Usage metrics 506 may further maintain metrics for a single monitoring file and/or multiple monitoring files. For example, instances of pattern p1 and/or p2 may span multiple log files, and the cumulative size and/or count may be tracked across the full corpus of log files. Analytic service 110 may access usage metrics 506 to generate analytic reports about logging activity and patterns within the system.

Referring again to FIG. 4, in operation 408, profiler 104 determines whether the pattern has been registered with pattern repository 106. If the pattern has been classified as problematic, then profiler 104 may determine if there are any interim remedies registered for the pattern. For instance, an administrator may register custom scripts or logic to execute if the pattern is detected and the triggering condition is satisfied. Additionally or alternatively, profiler 104 may trigger the other remedial actions described herein.

If the pattern is unclassified, then in operation 410, profiler 104 registers the pattern with pattern repository 106. In some embodiments, profiler 104 classifies newly detected, unclassified patterns that satisfy the triggering conditions as problematic.

In operation 412, profiler 104 sends, via alert interface 114 a notification of problematic behavior to one or more administrators. During this operation, profiler 104 may determine which administrators are registered with a pattern that triggered the alert. Profiler 104 may then send an email, SMS message, social media post, and/or other notification through one or more communications channels based on the contact information registered with log management system 100. For new patterns, profiler 104 may apply machine learning, as previously described, to predict the relevance of the alert to administrators registered with the system. In other embodiments, profiler 104 may determine relevance based on a set of rules, such as the source of the log messages conforming to the patterns. For instance, if log messages conforming to a pattern predominantly originate from data tier 140, then a database administrator may be notified. If the log messages originate from another tier, then other administrators may be notified based on the tier from which the majority of the messages originate.

Additionally or alternatively, profiler 104 may trigger other actions when the condition is satisfied to limit further generation and/or storage of log messages conforming to problematic log patterns. For example, one or more system components may be configured to monitor and filter messages conforming to the pattern to prevent additional instances of the pattern from being stored in monitoring files. As another example, profiler 104 may reduce the logging rate by changing a log level to reduce low priority log messages. As another example, profiler 104 may selectively disable log or trace providers that are predominantly generating messages conforming to the problematic pattern. Profiler 104 may further publish pattern information to compute nodes within a distributed environment, as described further below, to reduce and/or filter log messages contributing to the problematic behavior.

In some embodiments, analytic service 110 generates analytic reports associated with the detected log patterns. The alert notifications may include links or copies of the analytic reports, which may facilitate detecting the root cause of problematic logging behavior. An analytic report may include statistics and metrics that indicate the impact of various logging patterns on system performance. Additionally or alternatively, the analytic report may include links and/or information identifying the source of problematic behavior. For example, the analytic report may include a link to the underlying source code and/or processes responsible for generating messages conforming to the problematic pattern. The report data may be consumed by diagnostic applications, which may analyze the linked source code and/or metrics to recommend and/or trigger remedial actions, such as automatically applying patches to update a trace provider or suggesting edits to the source code to reduce the performance impact of the logging operations.

Figure 6:
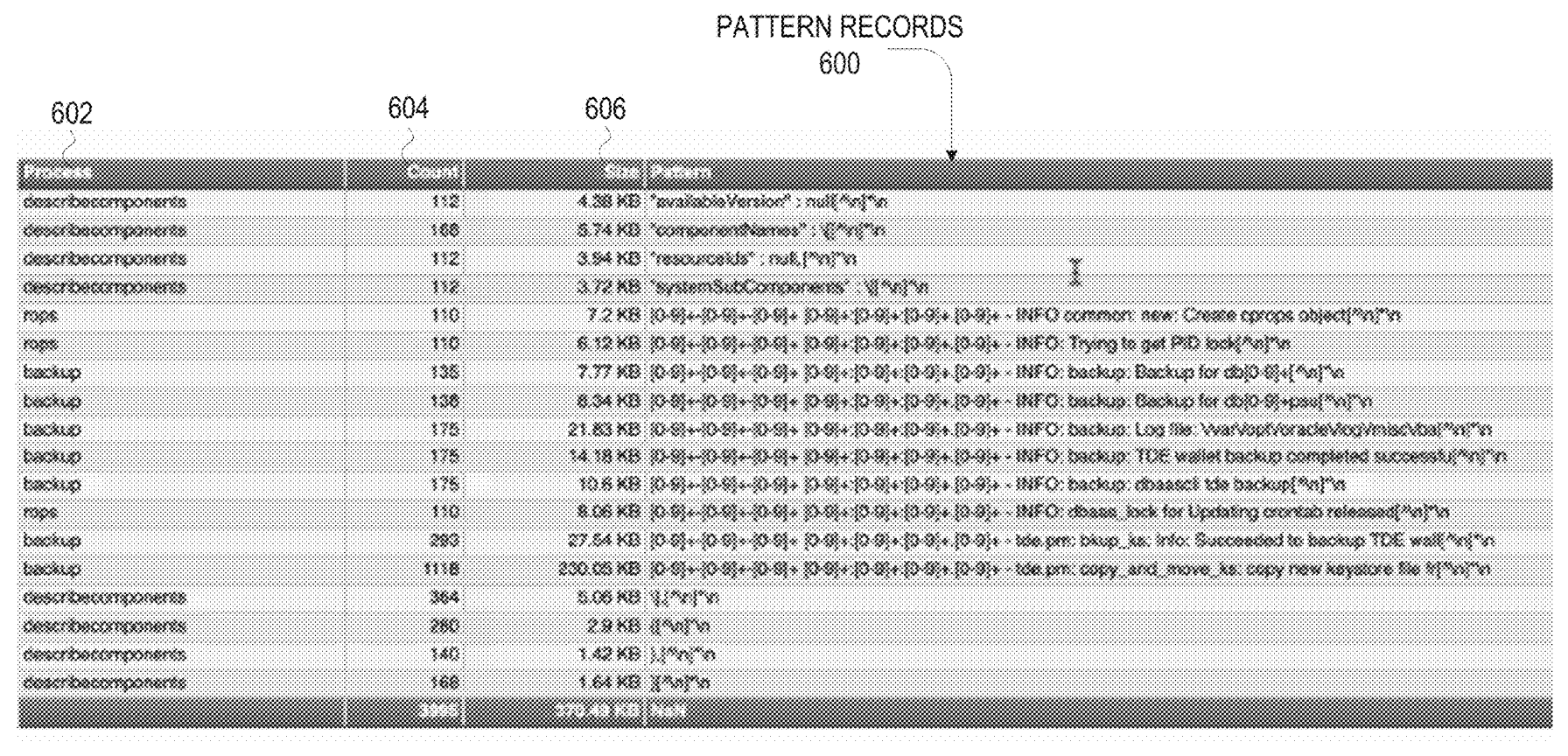

FIG. 6 illustrates an example report identifying detected log patterns and aggregated information in accordance with some embodiments. Pattern report 600 present several different detected log patterns. Column 602 presents the name of a process that was the source of the pattern, column 604 presents a count of how many times the pattern was detected, and column 606 presents the cumulative size of the pattern. Pattern report 600 further presents the total count and size across all patterns. Thus, the report allows administrators 116 to quickly glean the individual and combined impact of problematic patterns.

6. Decentralized and Distributed Monitoring

In some embodiments, log management system 100 publishes patterns stored in pattern repository 106 to monitoring components in a distributed compute environment. For example, log management system 100 may distribute the regexes registered in pattern repository 106 to MAs 126a, 126b, 136a, 136b, and/or 146. The monitoring nodes may perform real-time monitoring of locally generated log data and filter log messages that match problematic patterns.

In some embodiments, log management system 100 publishes patterns when the patterns satisfy a triggering condition. For example, log management system 100 may send one or more pattern regexes to remote nodes when the cumulative count and/or storage size of the patterns exceeds a threshold value. The monitoring nodes may then reduce the data that is transmitted by filtering out or otherwise removing messages from locally generated log data when the messages conform to the published pattern(s). For instance, a monitoring agent on DB host 142 may receive a regex from log management system 100. In response, the monitoring agent may filter trace messages generated by TP(s) 148. Different monitoring agents may concurrently filter trace messages generated by TP(s) 128a, 128b, 138a, and 138b to allow for local monitoring and reduction of trace messages. Locally monitoring and filtering messages may reduce the amount of log data sent to data collector 102, which may help avoid saturating the network with the transmission of log data. In addition, the filtered messages may not be stored in monitoring files, which may significantly reduce the storage overhead of excessive log patterns.

In some embodiments, log management system 100 may selectively publish messages and/or control which components locally monitor and filter messages. For example, if the problem primarily originates in application tier 130, then log management system 100 may configure MAs 136a and 136b to monitor and filter data conforming to the problematic pattern. Monitoring agents in other tiers may continue operating without checking the locally generated log data. Additionally or alternatively, log management system 100 may configure individual monitoring agents within the same tier, such as one of MAs 136a or 136b, to monitor and filter data while the other node in the same tier operates normally.

Thus, log management system 100 may flexibly control nodes to reduce the risk of flooding with minimal impact on system performance.

7. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates computer system 700 upon which some embodiments of the invention may be implemented. Computer system 700 includes bus 702 or other communication mechanism for communicating information, and a hardware processor 704 coupled with bus 702 for processing information. Hardware processor 704 may be, for example, a general-purpose microprocessor.

Computer system 700 also includes main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light emitting diode (LED) monitor, for displaying information to a computer user. Input device 714, which may include alphanumeric and other keys, is coupled to bus 702 for communicating information and command selections to processor 704. Another type of user input device is cursor control 716, such as a mouse, a trackball, touchscreen, or cursor direction keys for communicating direction information and command selections to processor 704 and for controlling cursor movement on display 712. Input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 700 can receive the data on the network line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

9. Miscellaneous; Extensions

Embodiments are directed to a system with one or more devices that include a hardware processor and that are configured to perform any of the operations described herein and/or recited in any of the claims below.

In some embodiments, one or more non-transitory computer-readable storage media comprise instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:
    identifying, by a log management system during runtime of a computer system that records log entries associated with events to one or more log files, a plurality of instances of a text pattern in the one or more log files;
    determining, by the log management system, a cumulative attribute associated with the text pattern, wherein the cumulative attribute comprises at least one of a cumulative storage size associated with the plurality of instances of the text pattern in the one or more log files or a cumulative count of the plurality of instances of the text pattern in the one or more log files;
    determining, by the log management system, that a triggering condition is satisfied based at least on the cumulative attribute associated with the text pattern; and
    responsive to determining that the triggering condition is satisfied: performing, by the log management system, at least one action that reduces computational resources consumed in association with a future event,
    wherein the at least one action does not prevent the future event from occurring, wherein without the at least one action, the future event would trigger storage of at least one log entry comprising at least one instance of the text pattern in the one or more log files, and wherein the at least one action comprises at least one of:
filtering the at least one instance of the text pattern to prevent storage of the at least one log entry in the one or more log files,
filtering the at least one instance of the text pattern to omit the at least one instance of the text pattern from the at least one log entry, or
limiting further generation of log messages conforming to log entries comprising the text pattern.

2. The media of claim 1,
wherein the at least one action further comprises modifying at least one of the log files to one or more instances of the text pattern within the one or more log files, and
wherein the instructions further cause:
retaining, within the one or more log files, at least one message that conforms to the text pattern.

3. The media of claim 1, wherein the instructions further cause:
determining whether the text pattern has been registered as a known problem;
responsive to determining that the text pattern has not been registered as a known problem:
storing the text pattern in a pattern repository; and
generating a classification for the text pattern based at least in part on which components in a computing system generated messages conforming to the text pattern in the one or more log files.

4. The media of claim 3, wherein the instructions further cause: sending an alert to one or more recipients that are determined based at least in part on the classification for the text pattern.

5. The media of claim 1, wherein determining that the triggering condition is satisfied comprises determining that the cumulative storage size for at least one of the one or more log files exceeds a threshold.

6. The media of claim 1, wherein determining that the triggering condition is satisfied comprises determining that the cumulative storage size for the text pattern across a plurality of log files exceeds a threshold.

7. The media of claim 1, wherein determining that the triggering condition is satisfied comprises determining that the cumulative count for the text pattern exceeds a threshold.

8. The media of claim 1, wherein the one or more log files store log messages generated by a plurality of components within a computing system, wherein a plurality of different log messages generated by two or more components of the plurality of components are mapped to the text pattern.

9. The media of claim 1, wherein the instructions further cause:
responsive to determining the triggering condition is satisfied, generating an analytic report that identifies the cumulative count of the text pattern in the one or more log files and one or more sources that caused generation of the text pattern in the one or more log files.

10. One or more non-transitory computer-readable media storing instructions which, when executed by one or more hardware processors cause:
identifying at least a first text pattern in a first set of log data;

generating a pattern representation for the first text pattern based at least in part on overlapping parts of two or more messages in the set of log data that conform to the first text pattern;
generating a pattern classification for the first text pattern based at least in part on whether the first text pattern is associated with problematic behavior;
mapping, within a pattern repository, the pattern representation for the first text pattern to the pattern classification;
detecting, by a log management system during runtime of a computer system that records log entries associated with events to one or more log files as a second set of log data, one or more messages in the second set of log data that match the first text pattern; and
responsive to detecting the one or more messages in the second set of log data that match the first text pattern:
performing, by the log management system, at least one action that reduces computational resources consumed in association with a future event,
wherein the at least one action does not prevent the future event from occurring,
wherein without the at least one action, the future event would trigger storage of at least one instance of the first text pattern in the one or more log files, and
wherein the at least one action comprises at least one of:
filtering the at least one instance of the text pattern to prevent storage of the at least one log entry in the one or more log files,
filtering the at least one instance of the text pattern to omit the at least one instance of the text pattern from the at least one log entry, or
limiting further generation of log entries comprising the text pattern.

11. The media of claim 10, wherein generating the pattern representation for the first text pattern comprises substituting at least one variable portion of the two or more messages with at least one metacharacter or placeholder value.

12. The media of claim 10, wherein the pattern representation for the first text pattern is a regional expression comprising at least one metacharacter and at least one literal.

13. The media of claim 10, wherein the instructions further cause:
training a machine learning model to classify log patterns based on features associated with the log patterns; and
applying the machine learning model to the first text pattern to generate the pattern classification.

14. The media of claim 10, wherein the pattern classification is generated based at least in part on a set of metrics associated with execution of the first text pattern.

15. The media of claim 10, wherein the instructions further cause:
publishing the first text pattern to a plurality of nodes in a distributed compute environment;
wherein the plurality of nodes monitor local log data for the first text pattern.

16. One or more non-transitory computer-readable media storing instructions which, when executed by one or more hardware processors cause:
training a machine learning model to classify text patterns detected in log data;
identifying, by a log management system during runtime of a computer system in which events are logged to one or more log files as a set of log data, a text pattern in the set of log data;

applying, by the log management system, the machine learning model to generate a classification for the text pattern in the set of log data; and based at least in part on the classification for the text pattern in the set of log data: performing, by the log management system, at least one action that reduces computational resources consumed in association with a future event, wherein the at least one action does not prevent the future event from occurring, wherein without the at least one action, the future event would trigger storage of at least one instance of the text pattern in the one or more log files, and wherein the at least one action comprises at least one of:
- filtering the at least one instance of the text pattern to prevent storage of the at least one log entry in the one or more log files,
- filtering the at least one instance of the text pattern to omit the at least one instance of the text pattern from the at least one log entry, or
- limiting further generation of log entries comprising the text pattern.

17. The media of claim 16, wherein applying the machine learning model to generate the classification for the text pattern comprises estimating a label for the text pattern based at least in part on a feature vector associated with the text pattern.

18. The media of claim 17, wherein the feature vector is generated based at least in part on a set of metrics associated with executing the text pattern.

\* \* \* \* \*